United States Patent
Heinz

[11] Patent Number: 5,980,257
[45] Date of Patent: Nov. 9, 1999

[54] METHOD AND DEVICE FOR ASSISTING HANDWRITING TRAINING

[76] Inventor: Mary Ann Heinz, 4415 Hueffmeier Rd., Defiance, Mo. 63341

[21] Appl. No.: 09/163,113

[22] Filed: Sep. 29, 1998

Related U.S. Application Data

[60] Provisional application No. 60/061,207, Oct. 6, 1997.
[51] Int. Cl.$^6$ .............................. B43L 15/00; G09B 11/00
[52] U.S. Cl. .............................. 434/166; 434/162; 401/6; 401/48
[58] Field of Search .................................. 434/155, 162, 434/166; 401/6, 8, 48; 482/44; 601/40

[56] References Cited

U.S. PATENT DOCUMENTS

| | | |
|---|---|---|
| 186,625 | 1/1877 | Ridge . |
| 217,499 | 7/1879 | Wells . |
| 565,374 | 8/1896 | Yarbrough . |
| 940,744 | 11/1909 | Smith . |
| 972,273 | 10/1910 | Smith ....................................... 434/166 |
| 1,136,450 | 4/1915 | Urase . |
| 1,303,304 | 5/1919 | Hauselmann . |
| 1,783,657 | 4/1930 | Kuntzleman . |
| 1,797,103 | 3/1931 | Rustad . |
| 2,501,552 | 3/1950 | Thompson . |
| 2,866,440 | 4/1958 | Green . |
| 3,373,509 | 3/1968 | Brass ....................................... 434/166 |
| 4,957,442 | 9/1990 | Prater ....................................... 434/166 |

*Primary Examiner*—Robert A. Hafer
*Assistant Examiner*—Kurt Fernstrom
*Attorney, Agent, or Firm*—Kevin L. Klug

[57] ABSTRACT

A method and device for assisting handwriting training which fosters a proper tripod writing grip, places the ring and little finger into a proper handwriting position and also helps to build the handwriting muscles. The device for assisting handwriting training is comprised of a wristband having an attached string with a charm and a pencil loop attached to the wristband. The method and device for assisting handwriting training is especially useful for persons having decreased hand strength or an inappropriate grasp pattern and for assisting children to learn proper grasp pattern.

7 Claims, 2 Drawing Sheets

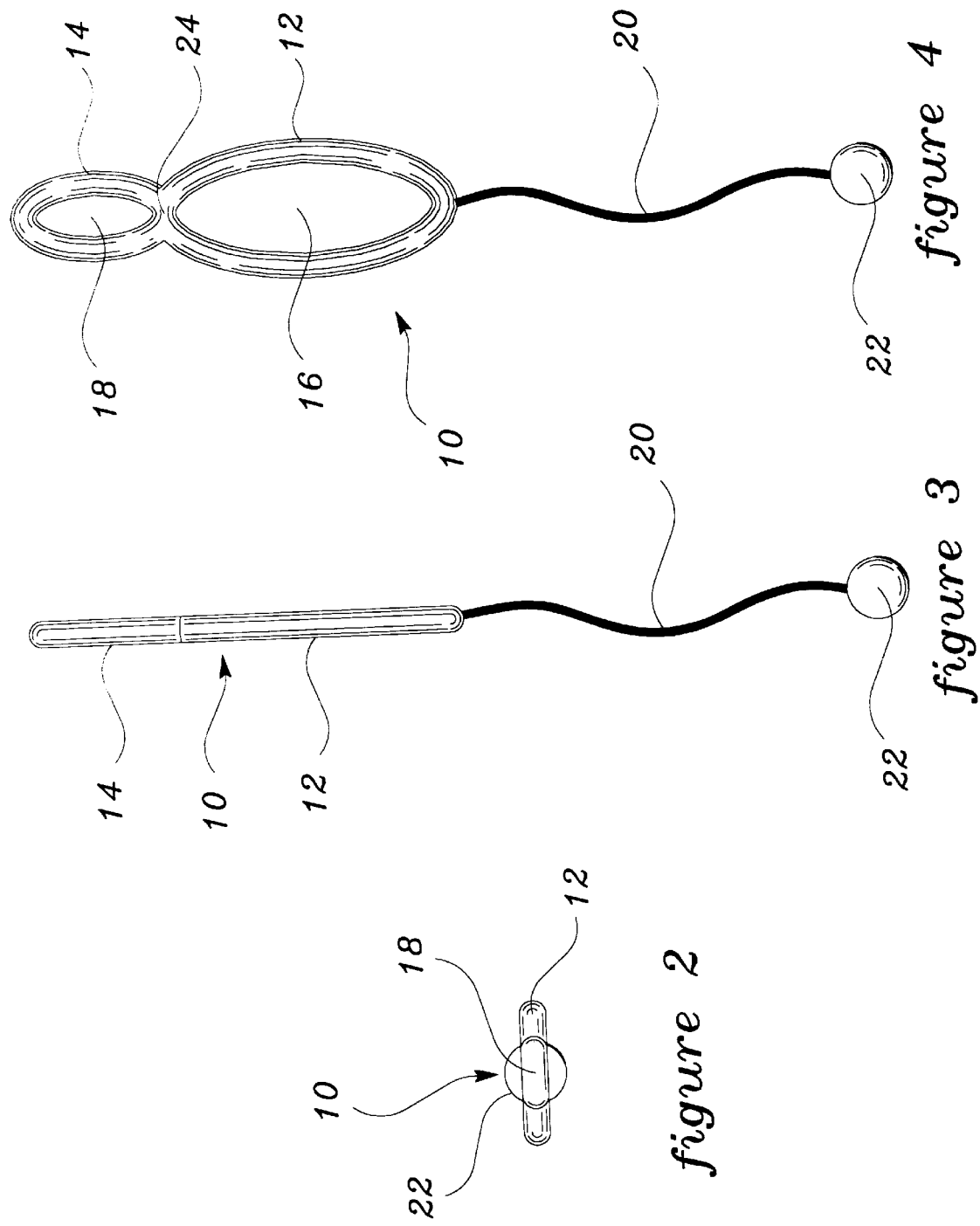

METHOD AND DEVICE FOR ASSISTING HANDWRITING TRAINING

This application claims priority of Provisional Patent Application #60/061,207, filed Oct. 6, 1997.

BACKGROUND OF THE INVENTION

The present invention relates in general to methods and devices for teaching proper handwriting skills and and more particularly to a method and device for teaching the proper technique for holding and grasping a pen or pencil. It is especially useful for persons having a decreased hand strength or an inappropriate grasp pattern and for assisting children to learn proper grasp pattern. The device comprises a wristband with an attached pencil loop, both preferably of an elastic material, a string attached to the wristband and a charm attached to said string opposite said wristband.

It has long been known that the proper method for holding a writing instrument is to hold the rear half of the instrument in the web space of the hand between the thumb and forefinger while also holding the writing half of the instrument between the side of the middle finger and the tips of the forefinger and thumb. This grip is generally recognized as a tripod grip. In addition to holding the writing instrument properly, proper handwriting technique requires that the fingers not used for holding the writing instrument, the ring and little fingers, be placed and pressed into the palm region of the hand. This placement of the ring and little fingers forms a solid base upon which the hand may be rested while writing. The art of the present invention assists persons with proper grip along with non-gripping finger placement and proper placement of the writing instrument.

The prior art devices and methods for assisting in handwriting training generally do not promote improvement of the holding and grasping aspects of writing. That is, they tend to hold or position the writing instrument for the user rather than applying forces to the instrument in order that it find a proper resting place within the hand of the user. Furthermore, the prior art provides little assistance for proper positioning of the fingers of the hand. The present invention not only applies forces for proper positioning and gripping of the writing instrument within the hand, but it also causes the fingers of the writing hand to be positioned for an optimum writing grip. Moreover, the art of the present invention, unlike the prior art, is capable of use by either right or left handed persons.

Accordingly, it is an object of the present invention to provide a method and device for assisting handwriting training that is capable of applying forces to a writing instrument in order to properly position the instrument within the hand of a user.

Another object of the present invention is to provide a method and device for assisting handwriting training which also causes the fingers of the hand to be positioned for a proper writing grip.

A further object of the present invention is to provide a device for assisting handwriting training which is capable of use by a right or left handed person.

A still further object of the present invention is to provide a device for assisting handwriting training which is lightweight, portable, comfortable and relatively inexpensive to manufacture.

SUMMARY OF THE INVENTION

To accomplish the foregoing and other objects of this invention there is provided a method and device for assisting handwriting training which helps to promote a proper tripod grip. The device is composed of a wristband, a pencil loop, a string attached to the wristband opposite the pencil loop and a charm attached to the string opposite its attachment with the wristband. In a preferred embodiment, the wristband and pencil loop are manufactured of an elastic material. Alternative embodiments may incorporate non-elastic materials.

The wristband is comprised of a flexible loop which is capable of placement around the wrist of a user. The pencil loop is also comprised of another flexible loop which is capable of accepting a writing instrument within its opening. In a preferred embodiment, the wristband and pencil loop are mounted in substantially the same plane and tangentially attached to each other. Alternative embodiments may mount the wristband and the pencil loop in a non planar relation at points which are not tangential. In a preferred embodiment, the pencil loop will generally be a smaller loop than the wristband.

In a preferred embodiment, the string is attached to the wristband opposite the tangential attachment point with the pencil loop. As previously mentioned, onto the end of the string is attached a charm. The charm may be of any form which is small enough to fit and be grasped within the palm of the hand by the fingers which are not holding the writing instrument. That is, the ring and little fingers. Typically the charm may be a small sphere or a theme figure such as an animal, space figure, sports figure or automobile.

In use the wristband is placed around the wrist and the rear half of a pencil or other writing instrument is placed within the pencil loop. The writing half of the pencil or writing instrument is then grasped with the normal tripod writing grip between the thumb, forefinger, and middle finger while the charm is held in the palm with the ring and little finger in order to keep the hand closed. The pencil loop serves to place a force on the rear portion of the writing instrument and seat the writing instrument correctly in the web space of the hand between the thumb and forefinger. The combination of the pencil loop and the charm held within the palm forces the person using the art of this invention to develop a proper grasp and also to strengthen their handwriting muscles. That is, movement of the writing instrument against the forces applied by the pencil loop serves to strengthen exactly those muscles which are necessary for handwriting.

This device may be manufactured of many types of materials including but not limited to plastic, leather, elastic, cloth, metal, or rubber. In a preferred embodiment, the elastic portions of this device may be manufactured from any stretchable material and may be covered with any material which provides comfort or aesthetic appeal to the user. The charm may be manufactured from any material and shape which is graspable and provides an aesthetic appeal to the user.

BRIEF DESCRIPTION OF THE DRAWINGS

Numerous other objects, features and advantages of the invention should now become apparent upon a reading of the following detailed description taken in conjunction with the accompanying drawings, in which:

FIG. 2 is a side plan view of a device for assisting handwriting training;

FIG. 3 is a top plan view of a device for assisting handwriting training;

FIG. 4 is a front plan view of a device for assisting handwriting training.

DETAILED DESCRIPTION

Figure 1:
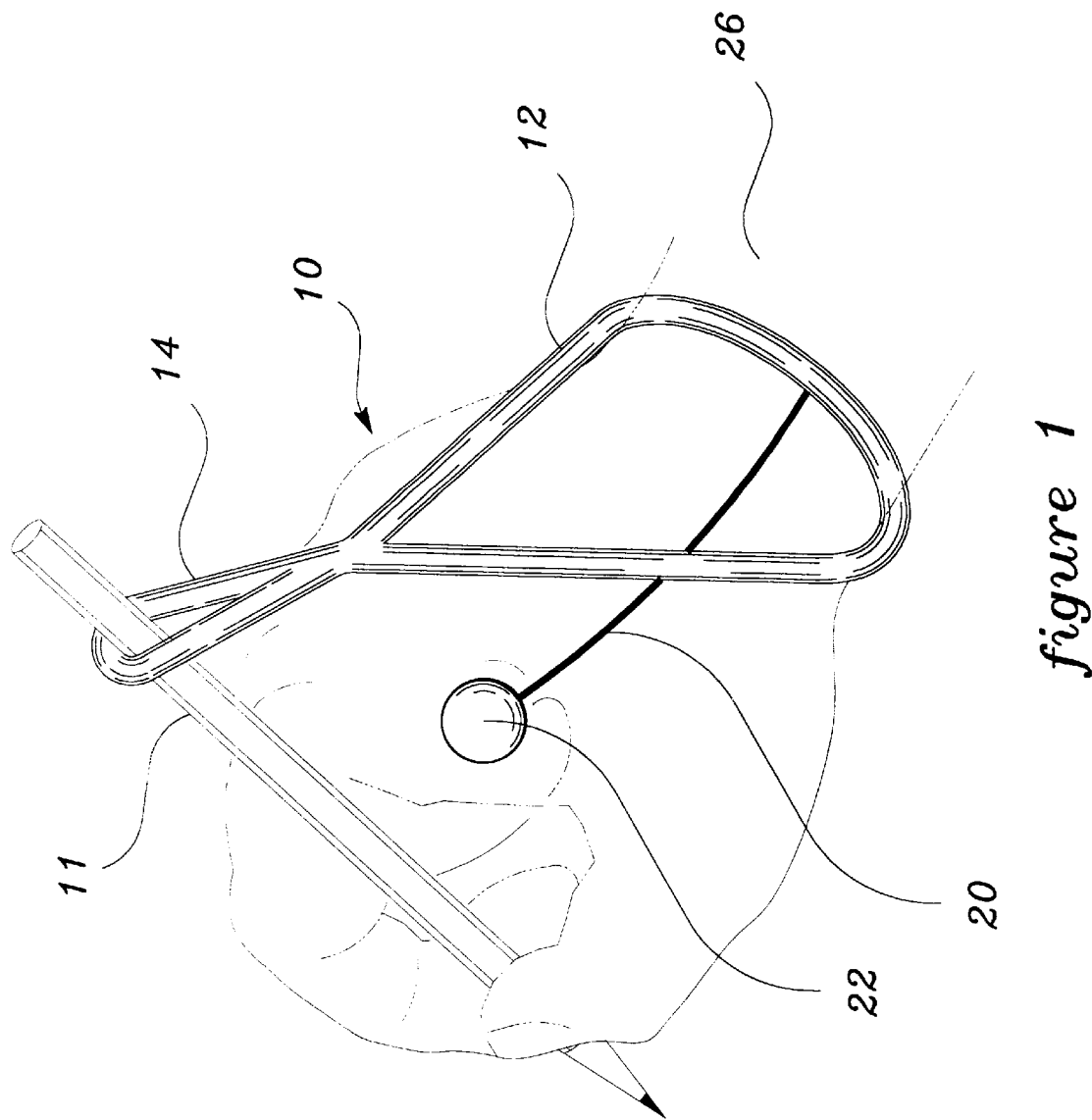
FIG. 1 is a perspective view of a device for assisting handwriting training shown positioned onto a hand and wrist.

Referring now to the drawings, there is shown in FIGS. 1–4 a preferred embodiment of the device for assisting handwriting training of this invention. The device for assisting handwriting training of the present invention is particularly adapted for use by persons having an inappropriate writing instrument grasp pattern or for assisting children to learn a proper grasp and develop necessary writing muscles.

The drawings show the device for assisting handwriting training 10 comprising a wristband 12, a pencil loop 14, a string 20, and a charm 22. In a preferred embodiment, the wristband 12 and pencil loop 14 are manufactured from an elastic material. In all embodiments, the wristband 12 has an interior wristband portion 16 and the pencil loop 14 has an interior pencil loop portion 18.

The wristband 12 is comprised of a flexible loop which is capable of placement around the wrist of a user. The pencil loop 14 is comprised of a second flexible loop which is capable of accepting a writing instrument 11 within its opening. In a preferred embodiment, the wristband 12 and pencil loop 14 are mounted in substantially the same plane and tangentially attached 24 to each other. Alternative embodiments may mount the wristband 12 and the pencil loop 14 in a non planar relation at points which are not tangential. In a preferred embodiment, attachment is achieved by tying the wristband 12 and a pencil loop 14 together, but alternative embodiments could attach with glue, clips, wire or any other means which provides a secure attachment. In a preferred embodiment, the pencil loop 14 will generally be a smaller loop than the wristband 12.

In a preferred embodiment, the string 20 is attached to the wristband 12 opposite the attachment point 24 with the pencil loop 14. As previously mentioned, onto the end of the string 20 is attached a charm 22. The charm 22 may be of any form which is small enough to fit and be grasped within the palm of the hand by the fingers which are not holding the writing instrument 11. As previously mentioned, the charm 22 may be a small sphere or a theme figure such as an animal, space figure, sports figure or automobile.

In operation, the wristband 12 is placed around the wrist 26 and the rear half of a pencil or other writing instrument 11 is placed within the pencil loop 14. The writing half of the pencil or writing instrument 11 is then grasped with the normal tripod writing grip between the thumb, forefinger, and index finger while the charm 22 is held within the palm with the ring and little finger in order to keep the hand closed. The pencil loop 14 serves to place a force on the rear portion of the writing instrument 11 and seat the writing instrument 11 correctly in the web space of the hand between the thumb and forefinger and also provide a force which helps to develop the handwriting muscles. The combination of the pencil loop 14 and the charm 22 held within the palm forces the person using the art of this invention to develop a proper grasp and also to strengthen their handwriting muscles.

From the foregoing description, those skilled in the art will appreciate that all objects of the present invention are realized. A method and device for assisting handwriting training has been shown and described. The device of this invention is able to apply the proper forces onto a writing instrument such that a proper tripod grip and proper writing form is fostered.

Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. A device for assisting handwriting training comprising:
   a wristband comprising a first loop having an interior wristband portion; and
   a pencil loop comprising a second loop having an interior pencil loop portion, said pencil loop attached to said wristband and thereby forming an attachment point; and
   a string attached to said wristband, said string having a charm attached opposite said wristband, whereby said wristband may be placed around a wrist of a user, said charm may be placed and held within said palm, and a rear portion of a writing instrument may be placed within said pencil loop, all to facilitate proper handwriting grip and form.

2. The device for assisting handwriting training as set forth in claim 1 whereby:
   said wristband and said pencil loop are formed from a flexible elastic material.

3. The device for assisting handwriting training as set forth in claim 1 whereby:
   said wristband and said pencil loop are attached such that they lie in a common plane.

4. The device for assisting handwriting training as set forth in claim 1 further whereby:
   said string is attached to said wristband opposite said attachment point.

5. A device for assisting handwriting training comprising:
   a wristband of elastic material comprising a first loop having an interior wristband portion; and
   a pencil loop of elastic material comprising a second loop which is smaller than said first loop and having an interior pencil loop portion, said pencil loop tangentially attached to said wristband and thereby forming an attachment point; and
   a string attached to said wristband opposite said attachment point, said string having a charm attached opposite said wristband, whereby said first loop of said wristband may be placed around a wrist of a user and elastically held, said charm may be placed and held in said palm by a ring and little finger, and a rear portion of a writing instrument may be placed within said second loop of said pencil loop whereby said pencil loop applies a force to said writing instrument in order to seat said instrument into a web of the hand between a thumb and forefinger, all to facilitate proper handwriting grip and form and to provide muscle development for handwriting.

6. A method for assisting handwriting training, the steps comprising:
   attaching a device for assisting handwriting training comprising a wristband with an attached pencil loop, and an attached string with an attached charm to a wrist of a user via said wristband; and
   inserting a rear portion of a writing instrument into said pencil loop; and
   further placing said rear portion of said writing instrument into a web space between a thumb and forefinger of a hand attached to said wrist; and
   holding a writing end of said writing instrument between a side of a middle finger and a forefinger and said thumb of said hand; and holding said charm in a palm of said hand with a ring finger and a little finger of said hand; and writing with said instrument both with and against the force applied by said pencil loop whereby said force fosters a proper tripod handwriting grip and an enhancement of the muscles necessary for handwriting and said holding of said charm places said ring finger and said little finger into a proper position for optimum handwriting.

7. The method for assisting handwriting training as set forth in claim 6, the steps further comprising:

forming said wristband and said pencil loop from a flexible elastic material whereby said elastic force holds said wristband onto said wrist; and writing against an elastic force provided by said elastic material of said pencil loop.

* * * * *